United States Patent Office 2,895,966
Patented July 21, 1959

2,895,966
MONOGLYCERIDE DIACETATES

Waldo C. Ault, Glenside, Pa., and Reuben O. Feuge, New Orleans, La., assignors to the United States of America as represented by the Secretary of Agriculture No Drawing. Application April 12, 1954
Serial No. 422,708

4 Claims. (Cl. 260—348)

(Granted under Title 35, U.S. Code (1952), sec. 266)

A non-exclusive, irrevocable, royalty-free license in the invention herein described, throughout the world for all purposes of the United States Government, with power to grant sublicenses for such purposes, is hereby granted to the Government of the United States of America.

This invention relates to plasticizer-stabilizers for synthetic resins and to plastic compositions comprising said plasticizer-stabilizers.

Most synthetic resins require plasticization to facilitate fabrication and to improve the flexibility and toughness of the product. Most of them also require stabilizers to improve heat and light stability. Most conventional plasticizers contribute nothing to heat and light stability and some actually detract from whatever stability the base resin might inherently possess.

In recent years it has been found that expoxidized natural glycerides such as epoxidized cottonsed oil, epoxidized soybean oil, epoxidized olive oil, etc., have some value as plasticizers and, in addition, are excellent stabilizers for certain synthetic resins. Unfortunately, they suffer the serious handicap that they have very limited compatibility with most resins and hence must be blended with large amounts of other, more compatible, plasticizers. The small proportion that is compatible is usually sufficient to provide satisfactory stability to heat and light but for most purposes is far less than is needed to provide sufficient plasticization. Accordingly, it is an object of this invention to provide epoxidized glycerides having both high stabilizing and high plasticizing action and compatibility in a wide range of synthetic resins.

The poor compatability of the epoxidized natural glycerides is believed to be due to the predominance of long-chain fatty acid radicals in the molecule.

According to the present invention, unsaturated glycerides having in general only one such long chain per molecule, instead of the three as in the natural glycerides are epoxidized to produce plasticizer-stabilizers having high stabilizer activity and also high compatibility and plasticizing efficiency in a wide range of synthetic resins. The glycerides used in the invention are those in which two of the three fatty acid groups in the molecules are aceto groups and the third is a long-chain unsaturated fatty acid group. Such monoglyceride diacetates are readily obtainable from unsaturated natural glycerides, such as cottonseed, soybean, olive, corn, tall or certain fish oils by known methods. It is to be understood, of course, that neither natural nor technical synthetic glycerides and compounds derived therefrom are pure chemical compounds. They are usually complex mixtures and can be described only by their average composition. For this reason, when we say that our starting material is a monoglyceride diacetate we mean that the average composition is about two aceto groups per molecule and that the third fatty acid group contains an average of at least about one double bond per molecule. Actually, such a technical product will contain appreciable amounts of glycerides having only one aceto group and perhaps a very small amount containing zero or three aceto groups. Likewise, the long-chain acid radicals will mostly contain one or more double bonds, although as many as about 25% may be saturated without excessive undesirable effect.

The monoglycerides diacetates may be epoxidized by any known method to produce the desired apoxidized monoglyceride diacetates. A convenient method comprises treatment at about room temperature with an organic peracid, such as performic, peracetic or perbenzoic acid, in a suitable solvent. It is desirable that substantially all of the olefinic double bonds in the monoglyceride diacetate be epoxidized; otherwise the product has much poorer plasticizing and stabilizing action in synthetic resins. The consumption of the peracid reagent in the epoxidation step is proportional to the number of double bonds to be oxidized. Since the peracid is an expensive reagent, it is usually preferred that the monoglyceride diacetate contain an average of not more than about three olefinic double bonds. It is desirable that a significant proportion of doubly and triply unsaturated compounds be present in the monoglyceride diacetate because their epoxidation yields plasticizers having especially high compatibility and stabilizing action in synthetic resins.

The epoxidized monoglyceride diacetates are compatible with, and show valuable plasticizing and stabilizing action in, most synthetic resins of commercial importance, including polyvinyl chloride, copolymers of vinyl chloride with vinyl esters or vinylidene chloride, cellulose esters, nitrocellulose and chlorinated rubber. They are particularly valuable in vinyl chloride polymers and copolymers.

The preparation and properties of our plasticizer-stabilizers and plastic compositions are illustrated by the following typical examples.

EXAMPLE I

*Preparation of monoglyceride diacetate.*—A monoglyceride was made from cottonseed oil by treating 200 g. of the oil with 31.4 g. of glycerol and 0.2 g. of sodium hydroxide. The reagents were agitated together under an inert atmosphere for 5 hrs. at 200° C. After washing with water to remove soap and glycerol, 180 g. of the product was acetylated by treatment with an excess of acetic anhydride for 1 hr. at 110° C. under an inert atmosphere yielding a product having an acetyl content of about 10%. The product was then stirred in hot water 10 minutes, then further washed with water and dried by passing an inert gas through it under vacuum.

*Epoxidation.*—One hundred grams of the cottonseed oil monoglyceride diacetate (iodine No. 72.8) was treated with 190 ml. of a 20% solution of peracetic acid in acetic acid. The latter reagent was added dropwise while stirring, the temperature being maintained at 20–25° C. Agitation at the same temperature was continued 3 hrs. after addition of the peracetic acid. The epoxidized cottonseed oil monoglyceride diacetate thus produced was then isolated by pouring the reaction mixture into a large volume of water, extracting with ether, washing with water, drying, and evaporating the ether. Thus 99 g. of a colorless oil having acid No. 4.5 and epoxide oxygen 3.57% was obtained. Properties of a vinyl chloride copolymer plasticized with this product are shown below.

EXAMPLE II

A soybean oil monoglyceride diacetate was prepared by the reaction of soybean oil with triacetin in the presence of catalytic proportions of sodium methoxide, After destroying the catalyst uncombined triacetin was removed by distillation. The resulting purified material (iodine No. 101.3). This material (iodine No. 101.3) was expoxidized by treating 175 g. of it with 420 ml. of a 20% solution of peracetic acid in acetic acid and recovering the product substantially as described in Example I. Thus 178.5 g. of epoxidized soybean oil monoglyceride diacetate was obtained, having acid No. 1.82; epoxide oxygen 4.55% and an acetyl content of 15.2%. Its properties in a vinyl chloride resin are shown below.

EXAMPLE III

Oleic acid was reacted with an excess of glycerin to yield a monoglyceride, probably 1-monoolein having a purity of about 95%. This was then acetylated as in Example I to yield the diacetate having acetyl content of 18.8%. The latter was epoxidized as described in Example I, 50 g. (iodine No. 58) being treated with 55 ml. of the peracetic acid reagent solution. Thus 46.5 g. of epoxidized glyceryl monooleate diacetate (monoepoxystearyl diaceto glyceride) was obtained. It was a colorless oil of acid No. 2.2; iodine No. 3.4 and epoxide oxygen content, 3.54%. Its properties in a vinyl chloride resin are shown below.

The expoxidized monoglyceride diacetates prepared as described in Examples I–III were evaluated as plasticizer-stabilizers for a commercial polyvinyl chloride-acetate copolymer (95:5). The plasticized compositions each contained 35% of plasticizer. Data on a sample plasticized with dioctyl phthalate (DOP), the most widely used commercial plasticizer for polyvinyl chloride resins, are included for comparison with our new plasticizers. The formulation containing DOP also contained 1% of basic lead carbonate as a stabilizer; otherwise the plastic became deeply discolored during compounding and molding of the sample. Use of such metallic stabilizers is frequently highly objectionable because of their toxicity and opacity.

Table I

| Plasticizer | Tensile strength, p.s.i. | Elongation, percent | 100% modulus, p.s.i. | Brittle point, °C. | Stability, hrs. | |
|---|---|---|---|---|---|---|
| | | | | | Heat, 160° C. | Light, U–V |
| DOP | 3,000 | 390 | 1,300 | −28 | 4 | 72 |
| Ex. I | 3,160 | 410 | 1,200 | −23 | 4 | >192 |
| Ex. II | 2,900 | 400 | 1,120 | −26 | 7 | >192 |
| Ex. III | 3,000 | 310 | 1,170 | −29 | | >192 |

From the data in Table I it is readily seen that the epoxidized monoglyceride diacetates are equal or slightly superior to DOP in plasticizing efficiency and heat stability (despite the metallic stabilizer in the DOP sample), and are greatly superior in light stability. Plastics containing them have the further advantage of being colorless, transparent and non-toxic. These same desirable properties were shown by the plasticizers of Examples I–III in other vinyl chloride polymers and copolymers, particularly copolymers with vinyl esters of saturated aliphatic acids having 2 to 18 carbon atoms, and with vinylidene chloride; in cellulose ester plastics; in nitrocellulose; and in chlorinated rubber.

Plasticizers having the same desirable properties as those of the above examples were obtained by replacing the cottonseed or soybean oil monoglyceride diacetate of Examples I and II respectively with similar derivatives of olive oil, corn oil, tall oil, certain fish oils and similar products containing a high percentage of unsaturated fatty acids.

In the examples cited the acetyl contents ranged from about 10% to 19%. Although products having acetyl contents in this range are preferred, products having acetyl contents below this range will have some value as plasticizers. In some cases acetylation may not be complete and hence products containing minor amounts of mono- and diglycerides come within the scope of our invention.

All the expoxidized monoglyceride diacetates were fully compatible with the vinyl resin in amounts up to at least 40% of the composition and none showed exudation on storage. In practical operation several types of plasticizers are frequently used in combination and in such combinations quite small proportions of a given plasticizer may be valuable. Hence, although we prefer to use our plasticizers in the range of 10 to 40% of the composition, we have found, for example, that small proportions even as little as 1% of the epoxidized monoglyceride diacetates confer increased light stability upon many plastic compositions in which they may be incorporated.

We claim:
1. Epoxidized monoglyceride diacetates of oils selected from the group consisting of cottonseed oil, soybean oil, olive oil, corn oil, tall oil, and fish oil.
2. Epoxidized cottonseed oil monoglyceride diacetate.
3. Epoxidized soybean oil monoglyceride diacetate.
4. Monoepoxystearyl diaceto glyceride.

References Cited in the file of this patent

UNITED STATES PATENTS

| | | |
|---|---|---|
| 2,255,487 | Feagin et al. | Sept. 9, 1941 |
| 2,458,484 | Terry et al. | Jan. 4, 1949 |
| 2,485,160 | Niederhauser et al. | Oct. 18, 1949 |
| 2,559,177 | Terry et al. | July 3, 1951 |
| 2,569,502 | Swern et al. | Oct. 2, 1951 |